June 4, 1946.　　　　O. G. LILJA　　　　2,401,359
BUTT WELDING MACHINE
Filed Sept. 27, 1943　　　2 Sheets-Sheet 1

Inventor
Oscar G. Lilja
BY
Parker, Carson, Pitzner & Hubbard
Attorneys.

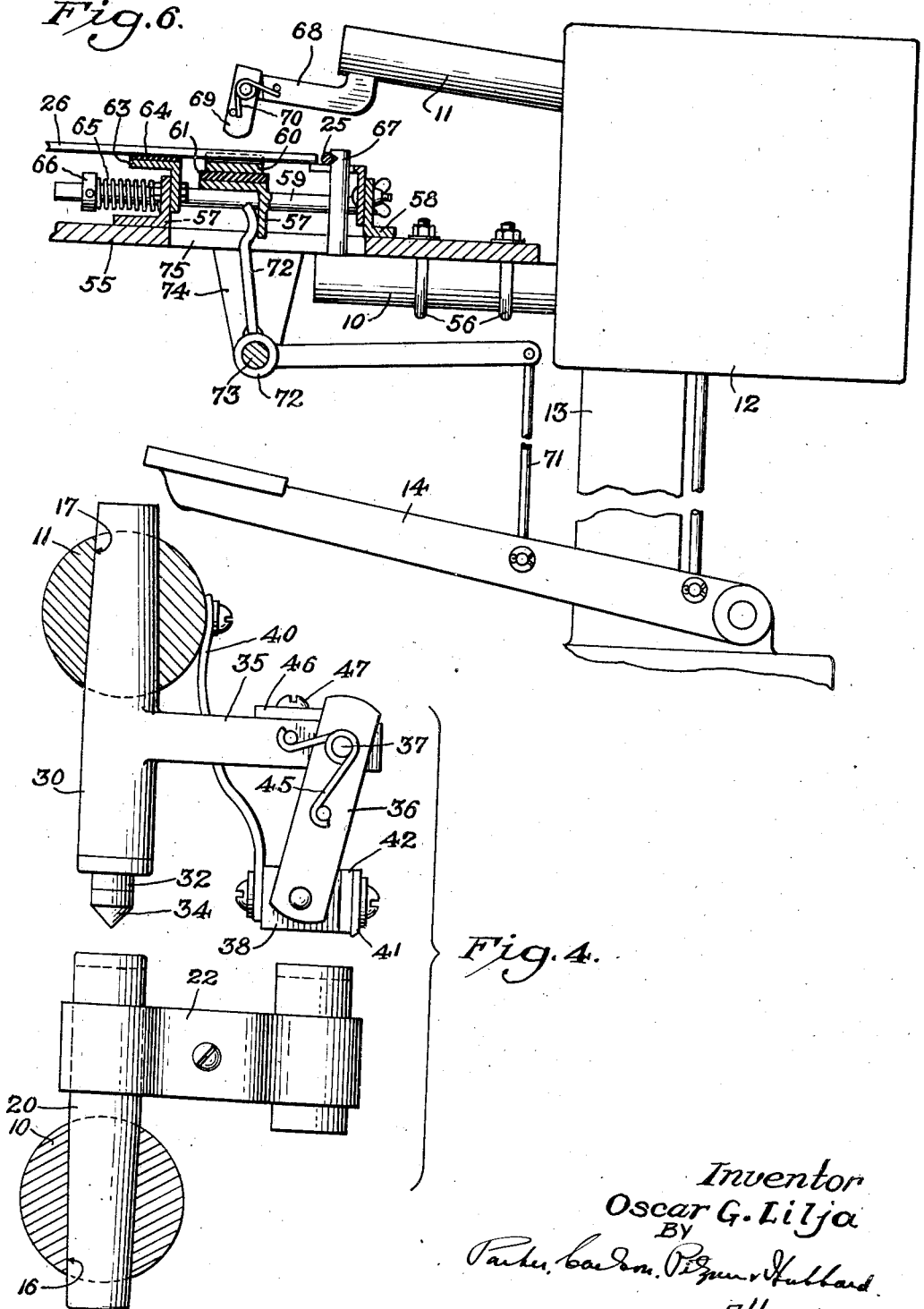

Patented June 4, 1946

2,401,359

UNITED STATES PATENT OFFICE 2,401,359

BUTT WELDING MACHINE

Oscar G. Lilja, Rockford, Ill.

Application September 27, 1943, Serial No. 503,947

20 Claims. (Cl. 219—4)

The invention relates to resistance welding machines of the type commonly known as spot welding machines and its general object is to provide a machine of that type adapted for butt welding.

Another object of the present invention is to provide novel work supporting and feeding means adapted to utilize the normal clamping movements of the electrode carrying arms of a spot welding machine to impart an endwise or axial thrust to an elongated workpiece for pressing it continuously against another workpiece to which it is to be welded.

Still another object is to provide novel mechanism for a welding machine of the above general character whereby the clamping of the workpieces in end-to-end relation and the feeding of one workpiece relative to the other to produce the pressure required for effectually joining the same during the welding operation is effected by a single actuating member.

A further object is to provide apparatus in the nature of an attachment which may be quickly and easily applied to a conventional spot welding machine to adapt the machine for butt welding.

Other objects and advantages of the invention will become apparent from the following detailed description of the preferred embodiments illustrated in the accompanying drawings in which:

Fig. 4 is a view similar to Fig. 3 but showing the parts in their normal, inactive positions.

Fig. 6 is a side elevational view of a spot welding machine equipped with a butt welding attachment of a modified form.

Figure 1:
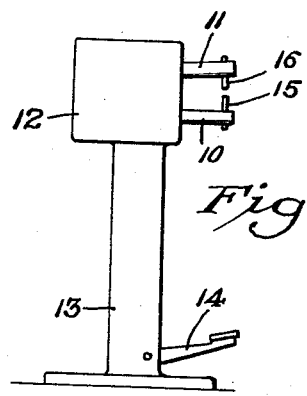
Figure 1 is a side elevational view of a conventional spot welding machine.

While the invention is susceptible of various modifications and alternative constructions, I have shown in the drawings and will herein describe in detail the preferred embodiments, but it is to be understood that I do not thereby intend to limit the invention to the specific forms disclosed but intend to cover all modifications and alternative constructions falling within the spirit and scope of the invention as expressed in the appended claims.

For purposes of illustration the invention has been shown and will be described herein as incorporated in a spot welding machine having electrode supporting arms 10 and 11 projecting laterally from one side of the housing 12 mounted on the upper end of a pedestal 13 as shown in Fig. 1. The lower arm 10 is fixed in the housing while the upper arm 11 is pivotally supported for rocking movement toward and from the stationary arm. Rocking of the arm 11 is accomplished by means of a treadle 14 pivotally supported at the lower end of pedestal 13.

The housing 12 encloses the usual transformer for supplying low voltage electric current to the electrode carrying arms 10 and 11 and conventional switching mechanism for controlling the current supply. The switching mechanism is actuated in well-known manner by treadle 14 to establish a flow of current for a predetermined interval when the movable electrode arm is rocked to operated position.

When a machine of the type above described is employed for spot welding, electrodes 15 and 16 of the usual type are mounted on the arms 10 and 11 which are provided at their outer ends with sockets 16 and 17 (Fig. 3) for the reception of the electrodes. With the arm 11 in its normal raised position, the electrodes are separated sufficiently to permit the insertion of the workpiece to be welded therebetween. The workpieces handled by machines of this character are usually relatively thin metal sheets arranged in face-to-face relation. Upon depression of the treadle 14 the sheets are pressed together between the electrodes and the current flow therethrough quickly generates a temperature sufficient to fuse the sheets together in the area clamped between the electrodes.

In carrying out the invention I provide one of the electrode carrying arms with means adapted to support a pair of elongated workpieces in abutting relation and the other electrode supporting arm with means operative as an incident to the actuation of one of the arms for imparting an axial thrust to one of the workpieces effective to shift or feed that workpiece toward the other workpiece while the welding current is flowing through the joint. In other words, the workpieces are continuously pressed together while the abutting surfaces are heated by the current flow therethrough thus insuring effectual welding of the same.

In the preferred embodiment of my invention herein illustrated, the improved work supporting and feeding means is in the nature of a fixture or attachment capable of being applied to any conventional spot welding machine to adapt such machine for butt welding. The term butt welding, as used herein, is intended to apply both to the welding of elongated workpieces in end-to-end relation as well as the welding of such workpieces in a general T-formation.

Figure 2:
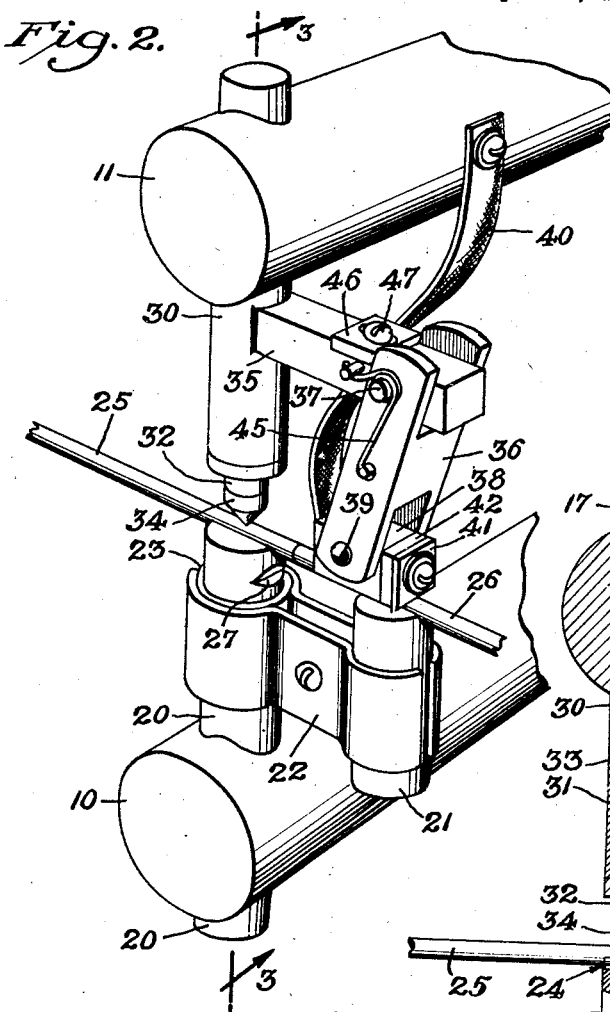
Fig. 2 is a fragmentary perspective view of a spot welding machine equipped with butt welding mechanism embodying the features of the invention.
Figure 3:
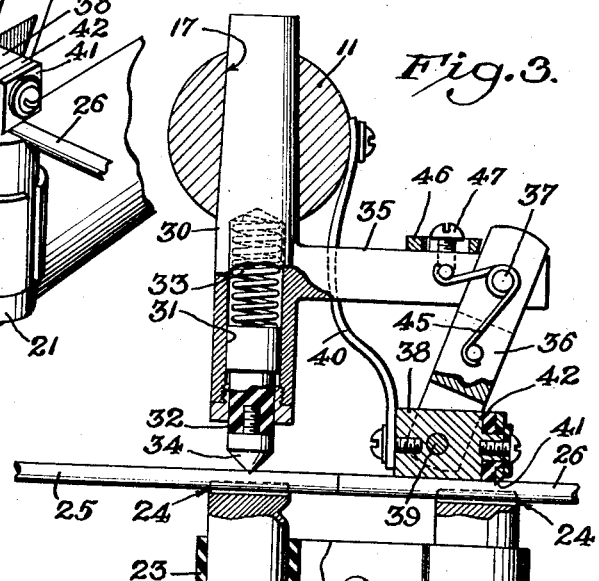
Fig. 3 is a sectional view taken in a vertical plane substantially on the line 3—3 of Fig. 2 showing the relative positions of the parts during a welding operation.

In the preferred embodiment illustrated in Figs. 2, 3 and 4, the work supporting means comprises a cylindrical metal electrode 20 fitted into the socket 16 of the arm 10 and a work supporting and guiding member 21 mounted in laterally spaced relation with respect to the electrode. As herein shown, the guide member is supported on the electrode 20 by means of a clamp 22 but is electrically insulated therefrom by an insulating sleeve 23 interposed between the clamp and the electrode.

The upper faces of the electrode and guide member may be suitably notched as at 24 for positioning and guiding workpieces such as cylindrical rods 25 and 26 to be welded together in end-to-end relation. For this type of work, the clamp 22 is adjusted so that the upper face of the guide 21 is in the same plane as the corresponding face of the electrode 20. For welding the rod 26 to one side of the rod 25, the clamp is adjusted to lower the guide 21 with reference to the electrode 20 and the rod 25 is then held in fixed position by a notch 27 formed in one side of the electrode. It will be understood that the electrode and guide member may be formed with notches of different shapes from those shown to accommodate workpieces of other cross-sectional shapes or their faces may be left unnotched when the machine is to be used for welding flat stock.

For cooperation with the work supporting and guiding means, the upper electrode carrying arm 11 is provided with a cylindrical post 30 adapted to fit into the socket 17 substantially in alinement with the electrode 20. The lower end of the post 30 is formed with an axial bore 31 adapted to slidably receive a clamping member in the form of a plunger 32 preferably of insulating material. A coiled compression spring 33 enclosed in the bore 31 and acting on the inner end of the plunger urges the latter outwardly. As shown in Fig. 3 the plunger 32 is provided on its outer end with a removable metal tip 34 pointed or otherwise suitably shaped for engagement with the workpiece supported on the electrode 20.

Projecting laterally from the post 30 and extending over the guide 21 is a bracket 35 supporting a feed pawl 36. The feed pawl, as herein shown, comprises an elongated metal block having its upper end bifurcated to straddle the bracket 35. A pivot pin 37 extending through the pawl and bracket supports the pawl for pivotal movement about an axis substantially parallel to the axis of the arm 11.

The lower end of the pawl 36 is also bifurcated and arranged to straddle a contact member 38 which is pivotally connected to the pawl by means of a pin 39. The contact member 38, herein shown as a generally rectangular metal block, is adapted to engage the workpiece supported on the guide 21 to clamp the workpiece thereto and to provide an electrical connection therewith. To this end, the contact member is connected by a flexible conductor strip 40 directly with the electrode supporting arm 11 thus by-passing the pivotal connections between the pawl and bracket and between the contact member and the pawl.

Mounted at one end of the contact member 38 is a blade-like gripping member 41 having a knife edge projecting below the lower face of the contact member and adapted to dig into the workpiece 26 and provide a non-slip connection between that workpiece and the contact member. The gripping member is preferably insulated from the contact member as by insulating strips 42 to prevent the flow of welding current through the member and thus avoiding any possibility of burning the knife edge of the member during the welding process.

The pawl 36 is yieldably held in a retracted or normal position by means of a spring 45 which may be of any suitable type. A stop member 46 adjustably secured to the bracket 35 by means of a screw 47 determines the limit position of the pawl. As will be seen by reference to Fig. 3, the screw 47 projects through a slot in the stop member thus permitting limited shifting of the member to adjust the normal position of the pawl.

The stop member 46 is set so that the pawl 36 is normally held at an angle to the path of movement of the electrode carrying arm 11. Accordingly, the blocking of the contact member 38 by the workpiece 26 in the downward movement of the electrode arm causes the pawl 36 to be rocked about its pivot in a clockwise direction from the normal position shown in Fig. 4 to the advanced position shown in Fig. 3. Due to the positive connection provided by the gripping element 41, an endwise thrust perpendicular to the direction of movement of the arm 11 is imparted to the workpiece 26 thus serving to press it against the workpiece 25. In this way the workpiece 26 is fed forwardly or toward the workpiece to which it is to be welded as the contacting portions of the two workpieces are fused thus maintaining the pieces in firm engagement at all times and insuring proper welding of the same.

In butt welding the workpieces 25 and 26 together in end-to-end relation, the initial movement of the arm 11 toward the operated position is effective to press the clamping member 34 against the workpiece to hold it in a fixed position against the electrode 20. The contact member 34 engages the workpiece 25 at substantially the same instant and clamps it to the guide 21. Upon further movement of the arm 11 in the same direction, the clamping member is forced back into the post 30 against the action of the spring 33 while the feed pawl 36 is rocked about its pivot to perform its function of feeding the workpiece 26 axially toward the workpiece 25. Thus a single actuator, in this instance the treadle 14, is operative to effect the clamping of the workpieces to their supports, the feeding of one workpiece substantially perpendicular to the direction in which the clamping pressure is applied, and the control of the supply of welding current to the workpiece.

As the guide 21 and the clamping member 34 are insulated from the electrodes 20 and 30 respectively, the workpieces 25 and 26 are connected to opposite sides of the current source through the electrode 20 and the contact member 38 respectively. More particularly, upon closure of the switching mechanism associated with the treadle 14, welding current passes through the arm 11, conductor strip 40, contact member 38, workpieces 26 and 25 and electrode 20 to the arm 10, the arms being connected to opposite terminals of the transformer in the usual manner.

Figure 5:
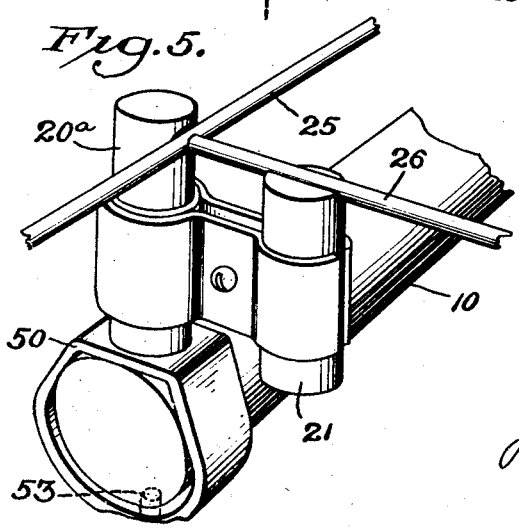
Fig. 5 is a fragmentary perspective view showing a modified arrangement for mounting the butt welding apparatus on the arms of the spot welding machine.

In welding the end of the workpiece 26 to the side of the workpiece 25, the clamping action of the member 34 is dispensed with and the workpiece 25 is placed in the groove 27 of the electrode 20 as shown in Fig. 5. The workpiece may be held in this position by hand or in any other preferred manner until sufficient pressure is applied on the workpiece 26 by the feed mechanism to hold the workpieces in place.

Fig. 5 discloses a modified arrangement for mounting the work supporting and guiding means on the electrode carrying arm 10. In this form of the apparatus, an electrode 20a is fixed on one side of an annular metal band 50 adapted to fit over the arm 10 and to be clamped thereto as by a set screw 53. It will be understood that a similar mounting arrangement may be used for the post 30 if desired.

In the modified welding machine shown in Fig. 6, the work supporting and guiding means comprises an elongated base plate 55 adapted to be clamped to the arm 10 as by U-bolts 56. Angle bars 57 and 58 mounted on the upper face of the plate provide spaced guides for a slide 59 which carries a work supporting and guiding member 60. As herein shown, the member 60 is mounted on an insulating plate 61 secured to an angle bar 57 welded or otherwise suitably attached to the slide. A stationary support and guide 63 attached to the angle bar 57 and provided with a face plate 64 of insulating material serves additionally to support and guide the workpiece 26.

When elongated workpieces such as rods 25 and 26 are to be welded together in T-formation, the latter is placed on the guide 60 carried by the slide 59 which is normally held in the retracted position shown in the drawing by a spring 65 interposed between the angle bar 57 and a collar 66 fixed to the slide. The companion workpiece 25 is held in fixed position by an electrode 67 fitted into the electrode socket of the arm 10 and projecting upwardly therefrom.

Upon depression of the treadle 14, the arm 11 is shifted downwardly in the usual manner and initially acts to clamp the workpiece 26 to the guide 60. For this purpose the arm is provided with a forwardly projecting bar 68 fitted into the electrode socket of the arm and having at its outer end a pivotally supported presser foot 69 adapted to engage the workpiece. A spring 70 yieldably holds the presser foot in a withdrawn position but permits it to rock forwardly (in a counterclockwise direction) in the advance of the slide 59.

The advance of the slide 59 and resultant axial feeding of the workpiece 26 toward the workpiece 25 is effected as an incident to the further depression of the treadle 14 through its switch actuating position. For this purpose the treadle is connected by a link 71 with one arm of a bell crank lever 72 pivotally supported as at 73 on a bracket 74 fixed to the underside of the plate 55. The other arm of the bell crank lever is arranged to project through a slot 75 in the plate 55 and to engage the flange of the angle bar 57. Depression of the treadle 14 is thus effective to shift the slide 59 forwardly or to the right as viewed in the drawing and, since the workpiece 26 is clamped thereto, it is likewise fed to the right or toward the workpiece 25 to which it is to be welded. As in the preferred form of the machine heretofore described, the workpieces are thus continuously pressed together during the welding operation to insure proper joining of the same.

It will be apparent from the foregoing that the invention provides a welding machine of the spot welding type embodying novel features of construction which adapt it for butt welding. The improved machine includes novel means for holding elongated workpieces in abutting relation and for imparting an endwise thrust to one piece effective to shift or feed that piece toward the other during the welding operation. Proper welding of the workpieces is thus insured. Moreover, the invention may be constructed in the form of a fixture or attachment capable of being quickly and easily applied to a conventional spot welding machine to adapt the machine for butt welding.

I claim as my invention:

1. In a welding machine, in combination, a stationary electrode carrying arm, a second electrode carrying arm movable toward and from the stationary arm between working and retracted positions, an electrode carried by the stationary arm, a work supporting and guiding member mounted at one side of said electrode and insulated therefrom, said electrode and said member cooperating to support two workpieces in abutting relation, a clamping member mounted on the movable arm and positioned to engage the workpiece supported by said electrode, a second electrode mounted at one side of said clamping member and positioned to engage the workpiece supported on said guiding member, said second electrode being shiftable toward said clamping member incident to the movement of the second arm to working position, and work gripping means shiftable with said second electrode for imparting a corresponding movement to the workpieces engaged thereby.

2. For use on a welding machine having a stationary arm and a second arm movable toward the stationary arm, an attachment comprising an electrode adapted to be mounted on the stationary arm, a work supporting and guiding member mounted in laterally spaced relation to said electrode, said member being insulated from the electrode, a clamping member and a contact member adapted to be mounted on the movable arm for cooperation with the electrode and the work supporting and guiding member respectively, said contact member and said clamping member being insulated from each other, one of said members being movable transversely of the direction in which the clamping pressure is applied to the work and operative in such movement to press one workpiece against the other.

3. An attachment for a welding machine comprising, in combination, an electrode carrying part adapted to support a pair of workpieces in abutting relation, a second electrode carrying part adapted to be mounted for movement toward and from said first part, a pawl pivotally supported on the second part, means yieldably holding said pawl in a normal position, a contact member carried by said pawl and engageable with one of the workpieces to provide an electrical connection therewith upon movement of the second part toward said first part, said pawl rocking about its pivot to impart an endwise thrust to said one workpiece in response to such movement of the second part, and a gripping element mounted on said contact member to provide a positive driving connection between the pawl and said one workpiece, said element being insulated from said contact member to prevent the passage of electric current therethrough.

4. For use in a welding machine, an electrode carrying part adapted to support a pair of workpieces in abutting relation, a second electrode carrying part adapted to be supported for movement toward and from the first part, a pawl pivotally supported on the second part, an adjustable stop adapted to define the normal position of the pawl, spring means yieldably holding the pawl against said stop, and a contact member carried by said pawl for engagement with one of said workpieces upon movement of the second part toward said first part, said pawl rocking about its pivot from said normal position to impart an endwise thrust to said one workpiece in response to such movement of the second part.

5. For use in a welding machine, a stationary electrode carrying part adapted to support a pair of workpieces in abutting relation, a second electrode carrying part adapted to be mounted for movement toward and from the stationary part, a pawl pivotally supported on the second part, spring means yieldably holding said pawl in a normal position, and a contact member carried by said pawl for engagement with one of said workpieces, said pawl rocking about its pivot against the action of said spring means to impart an endwise thrust to said one workpiece in response to the movement of the second part toward said stationary part.

6. For use in a welding machine, a support providing separate stationary surfaces adapted to engage a pair of elongated workpieces to hold the latter in abutting relation, a member adapted when moved toward said support to engage and hold said workpieces against said stationary surfaces, and means actuated by continued movement of said member following such engagement to shift one of the workpieces relative to and along its stationary supporting surface and endwise toward the other workpiece.

7. A butt welding attachment for spot welding machines comprising, in combination, means adapted to be mounted on one electrode arm of the machine for supporting two elongated workpieces in abutting relation and for providing an electrical connection with one workpiece, means adapted to be mounted on the other electrode arm of the machine for movement toward said supporting means to clamp the workpieces to their respective supports and to provide an electrical connection with the other of said workpieces, one of said clamping means being shiftable toward the other in their movement to clamping position for pressing one workpiece against the other.

8. A butt welding attachment for spot welding machines comprising, in combination, means adapted to be mounted on one electrode arm of the machine for holding a pair of elongated workpieces in abutting relation and for providing an electrical connection with one of the workpieces, means adapted to be mounted on the other electrode arm of the machine including a pair of laterally spaced members engageable respectively with the two workpieces, one of said members providing an electrical connection with the other of said workpieces and being operative to shift said other workpiece transversely of the direction in which the clamping pressure is applied so as to press the workpieces firmly together.

9. A butt welding attachment for spot welding machines comprising, in combination, a member adapted to be secured to the stationary arm of the machine and operative to hold an elongated workpiece in a fixed position, a guide mounted on said member in laterally spaced relation for holding a second elongated workpiece with one end abutting said first mentioned workpiece, means adapted to be mounted on the movable arm of the machine including a bracket projecting laterally from the arm over said guide, a pawl pivoted on said bracket and carrying a contact member engageable with and operative to clamp the second workpiece to said guide, said pawl rocking about its pivot to feed said second workpiece toward the first workpiece in response to the movement of the movable machine arm.

10. A butt welding attachment for spot welding machines comprising, in combination, a member adapted to be secured to the stationary arm of the machine and operative to hold an elongated workpiece in a fixed position, a guide mounted on said member in laterally spaced relation for holding a second elongated workpiece with one end abutting said first mentioned workpiece, means adapted to be mounted on the movable arm of the machine including a bracket projecting laterally from the arm over said guide, a pawl pivoted on said bracket, a contact member adapted to engage the second workpiece to provide an electrical connection therewith and to clamp the same against said guide, a gripping element carried by said contact member in position to grip the second workpiece, said pawl rocking about its pivot so as to shift the contact member, the gripping element and the second workpiece transversely of the direction of movement of the movable machine arm in response to such movement of the arm.

11. A butt welding attachment for spot welding machines comprising, in combination, a member adapted to be secured to the stationary arm of the machine and operative to hold an elongated workpiece in a fixed position, a guide mounted on said member in laterally spaced relation for holding a second elongated workpiece with one end abutting said first mentioned workpiece, means adapted to be mounted on the movable arm of the machine including a bracket projecting laterally from the arm over said support, a pawl pivoted on said bracket, a contact member adapted to engage the second workpiece to provide an electrical connection therewith and to clamp the same against said guide, said pawl rocking about its pivot to shift the second workpiece toward the first workpiece in response to the operation of the movable machine arm, and adjustable stop means adapted to determine one limit position of the pawl.

12. A butt welding attachment for spot welding machines comprising, in combination, an electrode adapted to be mounted on the stationary electrode supporting arm of the machine and having its face notched to hold an elongated workpiece, a work guide mounted on said electrode and spaced laterally therefrom, said guide being insulated from the electrode and adapted to hold a second workpiece in abutting relation to the workpiece supported by the electrode, a post adapted to be mounted on the movable electrode supporting arm of the machine substantially in alinement with said electrode, a clamping member insulated from and yieldably supported on said post for engagement with the workpiece supported by said electrode, a bracket projecting laterally from said post, a pawl pivotally supported on said bracket, and an electrode carried by said pawl for engagement with the workpiece supported on said guide, said pawl rocking about its pivot to feed the workpiece engaged by the second mentioned electrode toward the other workpiece in response to movement of the movable arm.

13. For use with a welding machine having upper and lower electrode arms and mechanism for moving said arms toward and away from each other, a butt welding attachment comprising, a post adapted to be mounted on the lower one of said arms to support a workpiece on its end, a member adapted to be mounted on the upper arm for movement therewith endwise toward said post end, a clamping element movably mounted on said member and urged toward said post whereby to engage and hold the supported workpiece and then permit continued movement of said member, means rigid with said post for supporting a second workpiece in abutment with said first workpiece, and means on said member operable in the movement thereof toward said post to engage said second workpiece and clamp the same against said support and then in the continued movement of said member to move the second workpiece along its support toward said first workpiece.

14. For use with a welding machine having two electrode arms and mechanism for moving said arms toward each other, a welding attachment comprising, means adapted when fastened to the lower one of said arms to support two workpieces in abutting relation, an element adapted to be mounted on said other arm for movement toward the supported workpieces, a member mounted on said element for movement therewith into engagement with one of the supported workpieces and adapted to yield after such engagement in continued movement of the element, and a second member mounted on said element for movement therewith to engage the other workpiece and then to move laterally and shift its engaged workpiece relative to its support and toward the first workpiece during said yielding of the first member.

15. A welding attachment comprising means adapted to support two workpieces in abutting relation, a member adapted to be mounted for movement away from and toward said supporting means, two elements mounted on said member for movement relative thereto longitudinally of the direction of said movement and transversely of such movement, said elements engaging the respective workpieces in the approaching movement of said member and holding the workpieces in abutting relation against said supporting means in the continued movement of the member, and means converting such continued movement of said members into transverse movement of one of said clamping elements in the direction of the other workpiece.

16. For use with a welding machine having two horizontal electrode arms and mechanism for moving said arms toward each other, a welding attachment comprising means adapted when fastened to the lower one of said arms to support and hold two workpieces with the end of one abutting the side of the other to form a T, a member adapted for engagement with one of the held workpieces, and means supporting said member for lateral movement toward the other workpiece and actuated by approaching movement of said arms following its engagement of the workpiece.

17. For use with a welding machine having two horizontal electrode arms and mechanism for moving said arms toward each other, a welding attachment comprising means adapted when fastened to the lower one of said arms to provide seats for locating two workpieces in abutting relation, clamping members mountable on the other of said arms and engageable with the respective seated workpieces in the movement of said arms toward each other, and means actuated by said movement following engagement of the workpieces to shift one of the workpieces in the direction of the other workpiece.

18. For use with a welding machine having two horizontal electrode arms and mechanism for moving said arms toward each other, a welding attachment comprising means adapted when fastened to the lower one of said arms to support two workpieces in abutting relation, a clamping member mountable on the other of said arms and engageable with one workpiece in the approaching movement of said arms toward each other, a second clamping member pivoted on the first member to engage said other workpiece in said approaching movement and then swing transversely of the direction of movement of said arms and toward the first clamping member whereby to advance the engaged workpiece along its support in the direction of the other piece.

19. A welding attachment comprising, one member having spaced surfaces electrically insulated from each other and forming seats for two workpieces to locate the same in abutting relation, a second member having spaced clamping surfaces electrically insulated from each other and spaced for engagement with the respective workpieces on said seats when the members are moved toward each other, and means on said second member supporting one of said clamping surfaces for lateral movement toward the other clamping surface and acting, after engagement of the workpieces and clamping surfaces, to move said movable clamping surface toward the other clamping surface and thereby shift the one workpiece toward the other.

20. In a welding machine, the combination of two members adapted to be mounted for relative bodily movement toward and away from each other, one of said members providing seats fixed relative to each other and receiving two workpieces to locate the latter in abutting relation, a clamping element adapted for gripping engagement with one of said workpieces to hold such piece in its seat and to slide the piece along its seat, and means on said other member supporting said clamping element for said gripping engagement and also for lateral movement, and actuated by the continuance of the approaching movement of said members following such engagement to slide the engaged workpiece along its seat toward the other workpiece.

OSCAR G. LILJA.